US012488919B2

(12) United States Patent
Yamada et al.

(10) Patent No.: US 12,488,919 B2
(45) Date of Patent: Dec. 2, 2025

(54) METHOD OF PRODUCING GRAIN-ORIENTED ELECTRICAL STEEL SHEET

(71) Applicant: JFE STEEL CORPORATION, Tokyo (JP)

(72) Inventors: Takuya Yamada, Tokyo (JP); Takashi Terashima, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 517 days.

(21) Appl. No.: 18/041,797

(22) PCT Filed: Aug. 31, 2021

(86) PCT No.: PCT/JP2021/032013
§ 371 (c)(1),
(2) Date: Feb. 16, 2023

(87) PCT Pub. No.: WO2022/050283
PCT Pub. Date: Mar. 10, 2022

(65) Prior Publication Data
US 2023/0326638 A1 Oct. 12, 2023

(30) Foreign Application Priority Data

Sep. 1, 2020 (JP) ................................ 2020-147009

(51) Int. Cl.
| | |
|---|---|
| *H01F 1/16* | (2006.01) |
| *C21D 6/00* | (2006.01) |
| *C21D 8/12* | (2006.01) |
| *C21D 9/46* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/60* | (2006.01) |

(52) U.S. Cl.
CPC ............... *H01F 1/16* (2013.01); *C21D 6/005* (2013.01); *C21D 6/008* (2013.01); *C21D 8/1222* (2013.01); *C21D 8/1233* (2013.01); *C21D 8/1255* (2013.01); *C21D 8/1261* (2013.01); *C21D 8/1283* (2013.01); *C21D 9/46* (2013.01); *C22C 38/001* (2013.01); *C22C 38/02* (2013.01); *C22C 38/04* (2013.01); *C22C 38/06* (2013.01); *C22C 38/60* (2013.01); *C22C 2202/02* (2013.01)

(58) Field of Classification Search
CPC ........................................................ C21D 9/46
See application file for complete search history.

(56) References Cited

U.S. PATENT DOCUMENTS

| | | | |
|---|---|---|---|
| 4,775,430 A | 10/1988 | Tanaka et al. | |
| 5,629,251 A | 5/1997 | Miyata | |
| 5,840,131 A * | 11/1998 | Yakashiro | ............ C21D 8/1283 148/113 |
| 2002/0000265 A1* | 1/2002 | Toda | ..................... C22C 38/002 148/307 |
| 2014/0246124 A1 | 9/2014 | Okubo et al. | |
| 2015/0187473 A1 | 7/2015 | Imamura et al. | |
| 2018/0215627 A1 | 8/2018 | Kinoshita et al. | |
| 2020/0123627 A1 | 4/2020 | Migita et al. | |

FOREIGN PATENT DOCUMENTS

| | | |
|---|---|---|
| CN | 103857827 A | 6/2014 |
| CN | 104471085 A | 3/2015 |
| CN | 108359896 A | 8/2018 |
| JP | S5550433 A | 4/1980 |
| JP | S62156226 A | 7/1987 |
| JP | H06212249 A | 8/1994 |
| JP | H07316831 A | 12/1995 |
| JP | H1088240 A | 4/1998 |
| JP | H1088241 A | 4/1998 |
| JP | H1088242 A | 4/1998 |
| JP | H11302742 A | 11/1999 |
| JP | 2001303258 A | 10/2001 |
| JP | 2003027251 A | 1/2003 |
| JP | 3650525 B2 | 5/2005 |

(Continued)

OTHER PUBLICATIONS

Jan. 23, 2024, Office Action issued by the China National Intellectual Property Administration in the corresponding Chinese Patent Application No. 202180052321.4 with English language search report.
May 15, 2025, the Extended European Search Report issued by the European Patent Office in the corresponding European Patent Application No. 21864340.1.
Nov. 16, 2021, International Search Report issued in the International Patent Application No. PCT/JP2021/032013.
May 9, 2024, Office Action issued by the China National Intellectual Property Administration in the corresponding Chinese Patent Application No. 202180052321.4 with English language concise statement of relevance.

*Primary Examiner* — Jophy S. Koshy
(74) *Attorney, Agent, or Firm* — KENJA IP LAW PC

(57) ABSTRACT

A method of stably producing grain-oriented electrical steel sheets with excellent film properties and magnetic properties that comprises subjecting a steel slab containing predetermined additive elements to hot rolling; subjecting the hot-rolled sheet to cold rolling to have a final sheet thickness; subjecting the cold-rolled sheet to decarburization annealing; applying an annealing separator having MgO as a main component to the decarburization annealing sheet; and subjecting the decarburization annealing sheet to finish annealing. The main component of the annealing separator has a BET specific surface area ratio $H_2O/N_2$ of 0.6 to 1.6 and a percentage of particles with a particle size of 40 μm or more in a slurry state of 5 mass % or less.

2 Claims, No Drawings

(56) References Cited

FOREIGN PATENT DOCUMENTS

| WO | 2008047999 A1 | 4/2008 |
|----|---------------|--------|
| WO | 2017169851 A1 | 10/2017 |
| WO | 2017195686 A1 | 11/2017 |

* cited by examiner

METHOD OF PRODUCING GRAIN-ORIENTED ELECTRICAL STEEL SHEET

TECHNICAL FIELD

This disclosure relates to a method of producing grain-oriented electrical steel sheets mainly used for the iron cores of transformers, etc., and in particular to a method of stably producing grain-oriented electrical steel sheets with excellent film properties and magnetic properties over the entire lengths and widths of the steel sheets.

BACKGROUND

Grain-oriented electrical steel sheets are soft magnetic materials mainly used for the iron cores of transformers, etc. and are required to have high magnetic flux density and low iron loss as magnetic properties. As an example, such a grain-oriented electrical steel sheet can be produced by subjecting a steel slab containing inhibitors necessary for secondary recrystallization, such as MnS, MnSe, and AlN, to hot rolling, subjecting the hot-rolled sheet to annealing as necessary, subjecting the hot-rolled sheet to cold rolling once or more than once with intermediate annealing to form a cold-rolled sheet having a final sheet thickness, and then subjecting the cold-rolled sheet to decarburization annealing and final annealing.

In the finish annealing in the above production method, the coiled steel sheet is annealed for a long time. Therefore, it is customary to apply an annealing separator to the coiled steel sheet before the finish annealing to prevent sticking between surfaces of adjacent turns of the coiled steel sheet during the finish annealing. In addition to the above role, this annealing separator also has a role to react with a $SiO_2$-based oxide film, which has been formed on the surface of the cold-rolled sheet at the time of the earlier decarburization annealing, to form a forsterite film.

This forsterite film is known to contribute to the improvement of magnetic properties by imparting not only electrical insulation properties but also tensile stress due to its low thermal expansion properties to the surface of the steel sheet to be produced. The formation behavior of this film also has a significant effect on the formation of inhibitors such as MnS, MnSe, and AlN, i.e., the formation behavior of secondary recrystallization. In addition, the forsterite film is known to contribute to the improvement of magnetic properties also by capturing inhibitors that are no longer needed after secondary recrystallization is complete and purifying the chemical composition of the steel sheet. From such perspectives, the formation of forsterite films with uniformity and excellent adhesion is very important for producing grain-oriented electrical steel sheets with excellent magnetic properties.

However, the steel sheet in coil form is annealed in the finish annealing, so the temperature and atmosphere greatly vary depending on the position in the coil. Thus, it is very difficult to homogeneously form the film over the entire length and width of the coil regardless of position of an outer winding portion, an intermediate winding portion, and an inner winding portion in the coil.

Various studies have been conducted on annealing separators to improve film properties. For example, JP3650525B2 (PTL1) proposes an annealing separator with CAA 70% of 250 sec to 1000 sec and CAA 70%/CAA 40% of 1.5 to 6.0 (CAA: degree of activity of citric acid up to the respective reaction rates); particle size %20 value of 1.2 μm or less (particle size %20 value: the maximum particle size at the 20% point of the integrated count from the small particle side in the laser diffractometry); and BET specific surface area of 20.5 $m^2/g$ to 35.0 $m^2/g$.

JPH1088241A (PTL 2) proposes using an annealing separator having MgO as a main component, in which the hydration rate curve with a temperature of 20° C. and a hydration time of 80 minutes or less satisfies a region bounded by points A, B, C, and D in FIG. 1.

CITATION LIST

Patent Literature

PTL 1: JP3650525B2
PTL 2: JPH1088241A

SUMMARY

Technical Problem

In the re-study to homogeneously form a film with uniformity and excellent adhesion, the inventors have found that both activity and hydration properties of the annealing separator interdependently have a significant effect on the film properties, and thus the magnetic properties of the steel sheet.

Specifically, if the annealing separator has low activity, forsterite formation is suppressed to thin the film. In this case, AlN, etc. are additionally formed by nitriding, resulting in an excess of inhibitors to degrade the magnetic properties.

If the annealing separator has high hydration properties, the steel sheet is additionally oxidized to make the film locally too thick, causing spot detachment. In this case, AlN, etc. are decomposed by oxidation, resulting in a lack of inhibitors to degrade the magnetic properties.

Therefore, the inventors found that an annealing separator to be used preferably has high activity and low hydration properties.

However, the conventional annealing separators disclosed in PTLs 1 and 2 did not necessarily combine high activity and low hydration properties sufficiently. In addition, such conventional annealing separators did not necessarily form homogeneous films and improve magnetic properties.

This disclosure advantageously solves the above problems and provides a method of stably producing grain-oriented electrical steel sheets with excellent film properties and magnetic properties over the entire steel sheets.

Solution to Problem

The inventors made intensive studies to solve the above problems. As a result, the inventors have completed this disclosure by newly finding that optimizing the BET specific surface area ratio $H_2O/N_2$ and the particle size after slurrying for the main component of the annealing separator can highly combine high activity and low hydration properties in the annealing separator to stably improve the film properties and thus the magnetic properties over the entire length and width of the steel sheet.

We provide:
1. A method of producing a grain-oriented electrical steel sheet, the method comprising:
   subjecting a steel slab containing, in mass %, C: 0.01% to 0.1%, Si: 2.0% to 5.0%, and Mn: 0.01% to 1.0% to hot rolling to form a hot-rolled sheet;

subjecting the hot-rolled sheet to cold rolling once or more than once with intermediate annealing to form a cold-rolled sheet having a final sheet thickness;

subjecting the cold-rolled sheet to decarburization annealing to form a decarburization annealing sheet;

applying an annealing separator having MgO as a main component on the surface of the decarburization annealing sheet; and subsequently subjecting the decarburization annealing sheet on which the annealing separator is applied to final annealing, wherein the main component of the annealing separator has a BET specific surface area ratio $H_2O/N_2$ of 0.6 to 1.6 and a percentage of particles with a particle size of 40 μm or more in a slurry state of 5 mass % or less.

Here, in this disclosure, the "main component of the annealing separator" is contained in the annealing separator in excess of a total of 50 mass % in solid content. It is permissible for the balance of the annealing separator to contain any additive of less than 50 mass % in solid content.

In this disclosure, the "BET specific surface area ratio $H_2O/N_2$," means the ratio of a BET specific surface area obtained by $H_2O$ gas adsorption to a BET specific surface area obtained by $N_2$ gas adsorption, and it can be calculated according to the method described below.

Furthermore, in this disclosure, the "percentage of particles with a particle size of 40 μm or more" means the cumulative percentage of main component particles with a particle size of 40 μm or more to the total main component particles in the particle size distribution measured for the main component in a slurry state, and it can be calculated according to the method described below. In other words, the "percentage of particles with a particle size of 40 μm or more" of the main component in this disclosure is a physical property that can be confirmed by slurrying and measuring the main component itself. The "particles" refer to dispersions, including agglomerates that are agglomerated in the slurry.

2. The method of producing a grain-oriented electrical steel sheet according to 1. above, wherein the main component of the annealing separator has a BET specific surface area ratio $H_2O/N_2$ of 0.8 to 1.4 and a percentage of particles with a particle size of 40 μm or more in a slurry state of 5 mass % or less.

Advantageous Effect

According to this disclosure, by using an annealing separator that combines high activity and low hydration properties, grain-oriented electrical steel sheets with excellent film properties and magnetic properties can be stably produced over the entire steel sheets.

DETAILED DESCRIPTION

Embodiments of this disclosure will be specifically described below. The following embodiments provide preferred examples of this disclosure, and this disclosure is by no means limited to these examples.

First, reference will be made to an experiment that led to the development of this disclosure.

Experiment 1

Steel slabs each containing, in mass %: C: 0.07%, Si: 3.4%, Mn: 0.06%, Al: 0.02%, N: 0.01%, Se: 0.02%, and S: 0.002%, with the balance being Fe and inevitable impurities, were heated under a set of conditions including 1380° C. and 30 minutes, hot rolled, cold rolled for the first time, intermediate annealed under a set of conditions including 1050° C. and 1 minute, and cold rolled again to form cold-rolled sheets having a final sheet thickness of 0.23 mm. The cold-rolled sheets were then subjected to decarburization annealing under a set of conditions including 840° C. and 2 minutes in a wet hydrogen atmosphere to form decarburization annealing sheets. Next, an annealing separator in a slurry state made by adding $TiO_2$ of 2.0 parts by weight to MgO of 100 parts by weight, dissolving it in water, and dispersing it by propeller agitation was applied to the surface of each decarburization annealing sheet. Each decarburization annealing sheet on which the annealing separator was applied was then wound on a tension reel and subjected to secondary recrystallization annealing under a set of conditions including 850° C. and 50 hours in coil form, followed by purification annealing under a set of conditions including 1200° C. and 5 hours in a hydrogen atmosphere (in the specification, these secondary recrystallization annealing and purification annealing are collectively referred to as "finish annealing").

Furthermore, a phosphate-based coating was applied to it, followed by flattening annealing under a set of conditions including 850° C. and 1 minute.

MgO, the main component of the annealing separator, was prepared by reacting $MgCl_2$ with water to form $Mg(OH)_2$, drying it, and then changing the reaction temperature and the baking temperature in various ways as presented in Table 1 in a baking process.

For each prepared main component, the BET specific surface area by $N_2$ gas adsorption was measured according to BET multipoint method of JIS Z8830 using BELSORP23SA made by MicrotracBEL, and the BET specific surface area by $H_2O$ gas adsorption was measured according to BET multipoint method of JIS Z8830 using BELSORP18 made by MicrotracBEL.

For each prepared main component, the percentage of particles with a particle size of 40 μm or more in a slurry state was calculated cumulatively from the particle size distribution obtained using a laser diffraction particle size analyzer (SALD3100 made by Shimadzu Corp.). More specifically, the particle size distribution was measured using a slurry obtained by propeller agitating MgO as the main component of 80 g and water as a dispersion medium of 50 cc under a set of conditions including 1500 rpm and 5 min.

Table 1 also presents the results of the evaluation of the uniformity and adhesion of the forsterite film formed on the surface of the steel sheet at each position of an outer winding portion, an intermediate winding portion, and an inner winding portion of the coil after the finish annealing. Here, the "outer winding portion", the "inner winding portion", and the "intermediate winding portion" of the coil refer to the outermost circumference and the innermost circumference of the coil, and the radial direction intermediate part of the coil between the outermost circumference and innermost circumference, respectively.

The uniformity of the film was evaluated by visually observing the appearance of the coil. For each position of the outer winding portion, the intermediate winding portion, and the inner winding portion, if there is no spot detachment or thinning across the entire width, it was rated ○: uniform; if there is partly spot detachment and/or thinning at the edge or in the center in the width direction, it was rated Δ slightly non-uniform; and if there is spot detachment and/or thinning across the entire width direction, it was rated x: non-uniform.

The adhesion of the film was evaluated by wrapping steel sheets sampled at the above respective positions around round bars of various diameters and visually measuring the smallest diameter that did not lead to the detachment of the film (hereinafter referred to as the "bending detachment diameter"). The smaller bending detachment diameter has better adhesion of the film.

After the flattening annealing, test specimens were taken across the entire width at the respective positions of the outer winding portion, the intermediate winding portion, and the inner winding portion, and each magnetic flux density $B_8$ (magnetic flux density at a magnetizing force of 800 A/m) and iron loss $W_{17/50}$ (iron loss with a magnetic flux density of 1.7 T and a frequency of 50 Hz) were measured according to JIS C2556. Table 1 also presents the mean values and standard deviations in the width direction.

[Table 1]

MgO with a BET specific surface area ratio $H_2O/N_2$ of 0.6 to 1.6 and a percentage of particles with a particle size of 40 μm or more in a slurry state of 5 mass % or less, as the main component of the annealing separator. Specifically, in Examples where the annealing separator containing the main component with the above predetermined properties was used, neither thinning nor spot detachment was observed as the film appearance, and the bending detachment diameter was as small as 20 mm.

In Examples where the annealing separator containing the main component with the above predetermined properties was used, good magnetic properties with minimal variation were obtained on steel sheets at any positions of the outer winding portion, the intermediate winding portion, and the inner winding portion. Specifically, in Examples, the mean value of the magnetic flux density $B_8$ was 1.915 T or more and its standard deviation was 0.003 or less at all positions of the outer winding portion, the intermediate winding portion, and the inner winding portion. Furthermore, in

TABLE 1

| No. | Preparation conditions of main component Reaction temperature/ °C. | Preparation conditions of main component Baking temperature/ °C. | BET specific surface area ratio $H_2O/N_2$ of main component | Percentage of main component particles of 40 μm or more in slurry state/ mass % | Uniformity of film (Appearance evaluation) Outer winding portion | Uniformity of film (Appearance evaluation) Intermediate winding portion | Uniformity of film (Appearance evaluation) Inner winding portion | Adhesion of film (Bending detachment diameter/mm) Outer winding portion | Adhesion of film (Bending detachment diameter/mm) Intermediate winding portion | Adhesion of film (Bending detachment diameter/mm) Inner winding portion | $B_8$/T Mean Outer winding portion | $B_8$/T Mean Intermediate winding portion |
|---|---|---|---|---|---|---|---|---|---|---|---|---|
| 1 | 40 | 600 | 0.62 | 5.3 | ○ | Δ | ○ | 20 | 40 | 20 | 1.929 | 1.895 |
| 2 | 40 | 800 | 0.54 | 5.8 | Δ | x | Δ | 40 | 50 | 40 | 1.899 | 1.887 |
| 3 | 60 | 600 | 0.82 | 2.3 | ○ | ○ | ○ | 20 | 20 | 20 | 1.934 | 1.920 |
| 4 | 60 | 800 | 0.68 | 3.1 | ○ | ○ | ○ | 20 | 20 | 20 | 1.927 | 1.919 |
| 5 | 60 | 1000 | 0.57 | 3.2 | Δ | ○ | Δ | 40 | 20 | 40 | 1.893 | 1.917 |
| 0 | 80 | 600 | 1.44 | 1.2 | ○ | ○ | ○ | 20 | 20 | 20 | 1.929 | 1.918 |
| 7 | 80 | 800 | 1.21 | 1.5 | ○ | ○ | ○ | 20 | 20 | 20 | 1.936 | 1.924 |
| 8 | 80 | 1000 | 1.03 | 1.8 | ○ | ○ | ○ | 20 | 20 | 20 | 1.930 | 1.922 |
| 9 | 100 | 800 | 1.67 | 0.7 | ○ | x | ○ | 20 | 40 | 20 | 1.932 | 1.724 |
| 10 | 100 | 1000 | 1.44 | 1.0 | ○ | ○ | ○ | 20 | 20 | 20 | 1.930 | 1.920 |

| No. | $B_8$/T Mean Inner winding portion | $B_8$/T Standard deviation Outer winding portion | $B_8$/T Standard deviation Intermediate winding portion | $B_8$/T Standard deviation Inner winding portion | $W_{17/50}$/(W/kg) Mean Outer winding portion | $W_{17/50}$/(W/kg) Mean Intermediate winding portion | $W_{17/50}$/(W/kg) Mean Inner winding portion | $W_{17/50}$/(W/kg) Standard deviation Outer winding portion | $W_{17/50}$/(W/kg) Standard deviation Intermediate winding portion | $W_{17/50}$/(W/kg) Standard deviation Inner winding portion | Remarks |
|---|---|---|---|---|---|---|---|---|---|---|---|
| 1 | 1.935 | 0.003 | 0.027 | 0.003 | 0.763 | 0.832 | 0.754 | 0.005 | 0.058 | 0.005 | Comparative Example |
| 2 | 1.893 | 0.018 | 0.020 | 0.019 | 0.824 | 0.846 | 0.832 | 0.038 | 0.044 | 0.043 | Comparative Example |
| 3 | 1.934 | 0.002 | 0.002 | 0.002 | 0.759 | 0.766 | 0.751 | 0.002 | 0.003 | 0.003 | Example |
| 4 | 1.924 | 0.002 | 0.002 | 0.003 | 0.768 | 0.773 | 0.768 | 0.002 | 0.003 | 0.005 | Example |
| 5 | 1.895 | 0.015 | 0.002 | 0.021 | 0.832 | 0.779 | 0.834 | 0.033 | 0.003 | 0.045 | Comparative Example |
| 6 | 1.928 | 0.003 | 0.003 | 0.003 | 0.765 | 0.778 | 0.765 | 0.005 | 0.005 | 0.005 | Example |
| 7 | 1.931 | 0.003 | 0.002 | 0.003 | 0.752 | 0.767 | 0.755 | 0.006 | 0.004 | 0.005 | Example |
| 8 | 1.931 | 0.002 | 0.003 | 0.002 | 0.753 | 0.768 | 0.753 | 0.003 | 0.005 | 0.003 | Example |
| 9 | 1.934 | 0.002 | 0.027 | 0.003 | 0.757 | 1.590 | 0.759 | 0.003 | 0.060 | 0.006 | Comparative Example |
| 10 | 1.925 | 0.002 | 0.002 | 0.002 | 0.758 | 0.772 | 0.760 | 0.003 | 0.004 | 0.004 | Example |

As presented in Table 1, forsterite films with uniformity and excellent adhesion were obtained on steel sheets at any positions of the outer winding portion, the intermediate winding portion, and the inner winding portion, when using Examples, the mean value of the iron loss $W_{17/50}$ was 0.780 W/kg or less and its standard deviation was 0.006 or less at all positions of the outer winding portion, the intermediate winding portion, and the inner winding portion.

Thus, in Examples, grain-oriented electrical steel sheets with excellent film properties and magnetic properties could be stably obtained over the entire length and width of the coil.

On the other hand, when the BET specific surface area ratio $H_2O/N_2$ of the main component exceeded 1.6, spot detachment of the film was observed at the intermediate winding portion. As described below, the "BET specific surface area ratio $H_2O/N_2$" in this disclosure can be said to be an indicator of the percentage of active sites to the surface area of the main component, and the higher ratio indicates the higher hydration properties of the annealing separator. Therefore, the spot detachment is considered to be a result of the steel sheet being significantly affected by the high hydration properties, at the intermediate winding portion, where the surface pressure is higher than those at other positions in the coil and thus the atmosphere is likely to stagnate.

Further, thinning of the film was observed at the intermediate winding portion when the percentage of main component particles with a particle size of 40 µm or more after the slurrying exceeded 5 mass %. As described below, the higher "percentage of particles with a particle size of 40 µm or more" of the main component causes lower activity of the annealing separator. Therefore, the thinning is considered to be a result of the steel sheet being significantly affected by the low activity, at the intermediate winding portion, which is a position where film formation is more difficult due to slower heating during the finish annealing than other positions in the coil.

When the BET specific surface area ratio $H_2O/N_2$ was less than 0.6, thinning of the film was observed at the outer winding portion and the inner winding portion, which are positions other than the intermediate winding portion, as in the case of low activity of the annealing separator. This is considered to be because the annealing separator had too low hydration properties, which reduced $SiO_2$ on the surface of the steel sheet to suppress forsterite formation.

Thus, in order to stably (i.e., homogeneously) improve film properties and thus magnetic properties over the entire coil, it is important to optimize both BET specific surface area ratio $H_2O/N_2$ of the main component itself of the annealing separator and particle size distribution of this main component in a state present in the slurry.

(Method of Producing Grain-Oriented Electrical Steel Sheet)

As described above, the method of producing a grain-oriented electrical steel sheet according to this disclosure is characterized by subjecting a steel slab containing predetermined additive elements to hot rolling, cold rolling, decarburization annealing, and annealing separator application, and using a main component that satisfies predetermined conditions as the annealing separator when finish annealing is performed. Specifically, the BET specific surface area ratio $H_2O/N_2$ of the main component is set to 0.6 to 1.6, and the percentage of particles with a particle size of 40 µm or more of the main component when measured as dispersed in the slurry is set to 5 mass % or less. Thus, if the annealing separator is applied and the annealing is performed by satisfying the above predetermined conditions, the annealing separator can combine high activity and low hydration properties to stably produce grain-oriented electrical steel sheets with excellent film properties and magnetic properties.

The grain-oriented electrical steel sheets obtained according to the production method of this disclosure have excellent film properties over the entire length and width and thus can stably exhibit excellent magnetic properties.

[Steel Slab]

The steel slab is required to contain, in mass %: C: 0.01% to 0.1%, Si: 2.0% to 5.0%, and Mn: 0.01% to 1.0% and may contain further additive elements as required. The balance of the chemical composition of the steel slab can be Fe and inevitable impurities. Hereinafter, "mass %" is simply indicated as "%" to describe the chemical composition of the steel slab.

C: 0.01% to 0.1%

C is an important component to improve the texture. However, if its content is less than 0.01%, sufficient effects cannot be obtained. If the C content exceeds 0.1%, decarburization is difficult to cause the deterioration of magnetic properties. In addition, if the C content exceeds 0.1%, an oxygen coating amount on the steel sheet decreases by an amount of oxygen used for decarburization, which leads to degradation of the properties of the forsterite film to be formed in the subsequent finishing annealing. Therefore, the C content is 0.01% or more and 0.1% or less. The C content is preferably 0.02% or more. The C content is preferably 0.08% or less. The C content is more preferably in the range of 0.02% to 0.08%.

Si: 2.0% to 5.0%

Si is an essential component to increase specific resistance and improve eddy current loss. However, if its content is less than 2.0% sufficient effects cannot be obtained. If the Si content exceeds 5.0% cold rolling properties are severely impaired. Therefore, the Si content is 2.0% or more and 5.0% or less. The Si content is preferably 2.5% or more. The Si content is preferably 4.5% or less. The Si content is more preferably in the range of 2.5% to 4.5%.

Mn: 0.01% to 1.0%

Mn, like Si, increases the specific resistance and improves the eddy current loss. Mn is also an important component to improve hot rolling properties. However, if its content is less than 0.01% sufficient effects cannot be obtained. If the Mn content exceeds 1.0% y transformation is induced to cause the deterioration of magnetic properties. Therefore, the Mn content is 0.01% or more and 1.0 mass % or less. The Mn content is preferably 0.01% or more. The Mn content is preferably 0.50% or less.

In addition to the above essential additive elements, the steel slab can further contain optional additive elements, as necessary. For example, MnS, MnSe, and/or AlN can be used as inhibitors in the formation of secondary recrystallization in the finish annealing process. When using such inhibitors, S, Se, Al, and N can be further added to the steel slab.

When MnS is used as an inhibitor, S: 0.002% to 0.03% is preferably further added to the steel slab.

When MnSe is used as an inhibitor, Se: 0.002% to 0.03% is preferably further added to the steel slab.

When AlN is used as an inhibitor, Al: 0.005% to 0.04% and N: 0.003% to 0.012% are preferably further added to the steel slab.

These inhibitors may be used separately or in combination.

In addition to the above components, one or two or more components selected from: B: 0.0002% to 0.0025%, P: 0.005% to 0.08%, Ti: 0.001% to 0.01%, Cr: 0.01% to 0.2%, Ni: 0.01% to 1.5%, Cu: 0.01% to 0.5%, Nb: 0.002% to 0.08%, Mo: 0.005% to 0.1%, Sn: 0.005% to 0.5%, Sb: 0.005% to 0.5%, and Bi: 0.002% to 0.08% may be further appropriately added to the steel slab.

[Hot Rolling, Cold Rolling, and Decarburization Annealing]

The steel slabs having the above chemical composition are subjected to hot rolling to form hot-rolled sheets; the hot-rolled sheets are subjected to cold rolling once or more than once with intermediate annealing to form cold-rolled sheets having the final sheet thickness; and the cold-rolled sheets are subjected to decarburization annealing to form decarburization annealing sheets. These processes are particularly not limited and can follow known methods.

If necessary, for example, the steel slabs may be heated prior to the hot rolling, or the hot-rolled sheets may be subjected to decarburization annealing after the hot rolling and before the cold rolling. These processes are also particularly not limited and can follow known methods.

[Application of Annealing Separator]

Next, an annealing separator having MgO as a main component is applied with 5 g/m$^2$ to 20 g/m$^2$ to both sides of the surface of each decarburization annealing sheet. The annealing separator is applied in a slurry state containing a main component having the above predetermined properties, which is usually powder, a dispersion medium, and optional additives, as necessary.

BET Specific Surface Area Ratio $H_2O/N_2$: 0.6 to 1.6

Here, the main component of the annealing separator is required to have a BET specific surface area ratio $H_2O/N_2$ of 0.6 to 1.6. The BET specific surface area ratio $H_2O/N_2$ is preferably 0.8 or more. The BET specific surface area ratio $H_2O/N_2$ is preferably 1.4 or less. The BET specific surface area ratio $H_2O/N_2$ is more preferably in the range of 0.8 to 1.4. If the BET specific surface area ratio $H_2O/N_2$ is less than or equal to the above upper limit, the hydration properties of the annealing separator are not excessively high, which can particularly suppress defects such as spot detachment of the film on the surface of the steel sheet located at the intermediate winding portion of the coil during the subsequent finish annealing. If the BET specific surface area ratio $H_2O/N_2$ is equal to or more than the above lower limit, the hydration properties of the annealing separator are not excessively low, which can particularly suppress thinning of the film on the surface of the steel sheet located at the outer winding portion and the inner winding portion of the coil.

As described above, the "BET specific surface area ratio $H_2O/N_2$" means the ratio of a BET specific surface area obtained by $H_2O$ gas adsorption to a BET specific surface area obtained by $N_2$ gas adsorption. $H_2O$ is polar and thus likely to be adsorbed by active sites present on the surface of the main component. In other words, the BET specific surface area obtained by $H_2O$ gas adsorption is an indicator of the amounts of active sites, and the "BET specific surface area ratio $H_2O/N_2$" can be an indicator of the percentage of active sites to the surface area of the main component. The higher "BET specific surface area ratio $H_2O/N_2$" of the main component causes higher hydration properties of the annealing separator containing this main component.

Percentage of Particles with a Particle Size of 40 μm or More in a Slurry State: 5 Mass % or Less The main component of the annealing separator is required to have particles with a particle size of 40 μm or more of 5 mass % or less, as measured in a slurry state. The particles with a particle size of 40 μm or more are preferably 3 mass % or less, and 0 mass %, i.e., the particles with a particle size of 40 μm or more may not be present. If the percentage of relatively coarse main component particles having the above particle size is less than or equal to the above upper limit in the slurry, the thinning of the film on the surface of the steel sheet located at the intermediate winding portion of the coil can be particularly suppressed without reducing the activity of the annealing separator. If this percentage is less than or equal to the above upper limit, defects such as pressing flaws on the surface of the steel sheet can be prevented in the application process of the annealing separator.

The actual application process of the annealing separator uses an annealing separator prepared under the same conditions for an amount of the main component, a type of the dispersion medium, and a dispersion method, in which the percentage of main component particles with a particle size of 40 μm or more in a slurry state has been confirmed to be 5 mass % or less. Therefore, also in the actual annealing separator, the percentage of main component particles with a particle size of 40 μm or more is 5 mass % or less. Here, the further addition of additives in the preparation of the annealing separator is not excluded. As long as the main component has the above predetermined properties, the annealing separator can have high activity and low hydration properties as desired to provide excellent film properties and magnetic properties to the steel sheet, regardless of the presence or absence of additives or the additive properties.

In the preparation of the annealing separator, CAA 40% (degree of activity of citric acid up to 40% reaction rate); hydration rate; Ig-loss (ignition loss); and amounts of trace components such as $SO_3$, Cl, and B, which may be further contained, can follow conventionally known values. Specifically, the CAA 40% may be 40 sec to 100 sec; the hydration rate may be 0.5 mass % to 5 mass %; the Ig-loss may be 0.3 mass % to 3 mass %; the $SO_3$ amount may be 0.02 mass % to 0.8 mass %; the Cl amount may be 0.002 mass % to 0.05 mass %, and the B amount may be 0.01 mass % to 2 mass %. If any of these is less than the lower limit, the annealing separator is likely to have low activity, and if any of these exceeds the upper limit, the annealing separator is likely to have high hydration properties. Therefore, if the above conditions are met, the film properties can be further improved.

As described above, the "percentage of particles with a particle size of 40 μm or more" of the main component means the cumulative percentage of particles with a particle size of 40 μm or more in the particle size distribution. The higher percentage indicates lower activity of the annealing separator containing the main component.

More specifically, in this embodiment, MgO was used as the main component, water was used as the dispersion medium, and MgO of 80 g and water of 50 cc were propeller agitated under a set of conditions including 1500 rpm and 5 min (i.e., under a set of conditions without ultrasonic dispersion) to prepare a slurry. For this slurry, the particle size distribution of the main component was obtained using a laser diffraction particle size analyzer (SALD3100 made by Shimadzu Corp.). This measurement method is closer to the actual usage pattern of the annealing separator than the usual measurement method under a set of conditions including ultrasonic dispersion by using sodium hexametaphosphate solution as a dispersion medium. Therefore, if the percentage of particles with 40 μm or more is more than the predetermined percentage in the measurement method in the specification, the film may be poorly formed due to insufficient activity of the actual annealing separator, or the main component may cake in the piping during the actual application process of the annealing separator, and the caked main component may be caught in the applied film of the annealing separator to cause problems such as pressing flaws on the surface of the steel sheet.

The following is an example of the method of optimizing the powder properties of MgO when the main component is MgO. In other words, the Mg raw material such as $MgCl_2$ is reacted with water or acid to form Mg salts such as $Mg(OH)_2$. After drying the Mg salts, in the process of obtaining MgO by baking, the reaction temperature at which the Mg salts are generated, the baking temperature of the generated salts, and/or the baking atmosphere are adjusted.

In general, the lower reaction temperature from the main component raw material to the generated salts decreases the particle size of the generated salts. Salts with smaller particle size tend to break easily during the subsequent baking, starting from the active sites, resulting in a decrease in the number of active sites of the main component and a decrease in the BET specific surface area ratio $H_2O/N_2$. In addition, the salts with smaller particle size tend to have smaller particle size even after baking, so they are likely to aggregate when slurried, resulting in the presence of particles (dispersions) having relatively large particle size in the slurry.

Increasing the baking temperature accelerates the thermal decomposition of the generated salts, causing the nuclei to grow in the process of particle shrinkage and the active sites of the main component to be likely to accumulate, thus decreasing the BET specific surface area ratio $H_2O/N_2$. Furthermore, lowering the oxygen partial pressure of the baking atmosphere can also expect the same effect as when the baking temperature is increased.

Thus, the reaction temperature from the main component raw material to the generated salts, the baking temperature of the generated salts, and the baking atmosphere have an effect on the "BET specific surface area ratio $H_2O/N_2$" and the "percentage of particles with a particle size of 40 μm or more in a slurry state" of the main component.

In addition to the above main component, the annealing separator may further contain one or two or more optional additives. For example, for the purpose of improving film properties and magnetic properties, conventionally known Li, Na, Mg, Al, Si, K, Ca, Ti, V, Fe, Co, Ni, Cu, Sr, Ba, lanthanide oxides, hydroxides, borates, carbonates, nitrates, phosphates, sulfates, and halides can be used as additives.

The annealing separator is applied to the surface of the decarburization annealing sheet in a slurry state in which the main component having the above predetermined properties and optional additives as necessary are dispersed in an optional dispersion medium.

As long as the main component satisfies the above predetermined properties, an amount of the main component, a type of the dispersion medium, types and amounts of additives, dispersion method, application method, etc. for the annealing separator are not particularly limited. As an example, the dispersion medium may be water or alcohol. The dispersion method may be agitation using stirring blades or agitation using a static mixer.

[Final Annealing]

The decarburization annealing sheets on which the annealing separator is applied are subjected to finish annealing to obtain grain-oriented electrical steel sheets. The finish annealing can include secondary recrystallization annealing to promote secondary recrystallization growth, purification annealing to remove unwanted steel components, etc. Furthermore, after the finish annealing, the grain-oriented electrical steel sheets may be subjected to the formation of insulating coating, flattening annealing, and/or magnetic domain refining treatment as necessary to form final products. These processes are particularly not limited and can follow known methods.

EXAMPLES

The following examples present preferred examples of this disclosure, and this disclosure is by no means limited to these examples. The following examples can also be implemented with modifications to the extent that they may conform to the purpose of this disclosure, and such modes are also encompassed in the technical scope of this disclosure.

Example

Steel slabs each containing, in mass %: C: 0.07%, Si: 3.4%, Mn: 0.06%, Al: 0.02%, N: 0.01%, Se: 0.02%, and S: 0.002%, with the balance being Fe and inevitable impurities, were heated under a set of conditions including 1380° C. and 30 minutes, hot rolled, cold rolled for the first time, intermediate annealed under a set of conditions including 1050° C. and 1 minute, and cold rolled again to form cold-rolled sheets having a final sheet thickness of 0.23 mm. The cold-rolled sheets were then subjected to decarburization annealing under a set of conditions including 840° C. and 2 minutes in a wet hydrogen atmosphere to form decarburization annealing sheets. Next, an annealing separator in a slurry state made by adding $TiO_2$ of 2.0 parts by weight to MgO of 100 parts by weight, dissolving it in water, and dispersing it by propeller agitation was applied to the surface of each decarburization annealing sheet. Each decarburization annealing sheet on which the annealing separator was applied was then wound on a tension reel and subjected to secondary recrystallization annealing under a set of conditions including 850° C. and 50 hours in coil form, followed by purification annealing under a set of conditions including 1150° C. and 5 hours in a hydrogen atmosphere.

Here, MgO, the main component of the annealing separator, was prepared by reacting $MgCl_2$ with water to form $Mg(OH)_2$, drying it, and then changing the reaction temperature and the baking atmosphere in various ways as presented in Table 2 in a baking process. The baking atmosphere was a $H_2/N_2$ mixed atmosphere, and the baking conditions were changed by adjusting this mixture ratio.

The "BET specific surface area ratio $H_2O/N_2$" and the "percentage of particles with a particle size of 40 μm or more in a slurry state" were measured according to the same method described above for Experiment 1.

Table 2 also presents the results of the evaluation of the uniformity and adhesion of the forsterite film formed on the surface of the steel sheet at each position of the outer winding portion, the intermediate winding portion, and the inner winding portion of the coil, as well as the magnetic flux density $B_8$ and the iron loss $W_{17/50}$ of the steel sheet, according to the same method described above for Experiment 1.

[Table 2]

TABLE 2

| | Preparation conditions of main component | | | | BET specific surface area ratio $H_2O/N_2$ of main component | Percentage of main component particles of 40 μm or more in slurry state/ mass % | Uniformity of film (Appearance evaluation) | | | Adhesion of film (Bending detachment diameter/mm) | | | $B_8$/T |
|---|---|---|---|---|---|---|---|---|---|---|---|---|---|
| No. | Reaction temperature/ ° C. | Baking temperature/ ° C. | Baking atmosphere $H_2$ concentration/ % | $N_2$ concentration/ % | | | Outer winding portion | Intermediate winding portion | Inner winding portion | Outer winding portion | Intermediate winding portion | Inner winding portion | Mean Outer winding portion |
| 1 | 40 | 800 | 5 | 95 | 0.93 | 5.3 | ○ | Δ | ○ | 20 | 40 | 20 | 1.939 |
| 2 | 40 | 800 | 10 | 90 | 0.79 | 4.9 | ○ | ○ | ○ | 20 | 20 | 20 | 1.932 |

TABLE 2-continued

| No. | | | | | | | | | | | | | |
|---|---|---|---|---|---|---|---|---|---|---|---|---|---|
| 3 | 40 | 800 | 15 | 85 | 0.71 | 5.6 | ○ | x | ○ | 20 | 50 | 20 | 1.932 |
| 4 | 40 | 800 | 20 | 80 | 0.54 | 5.7 | Δ | x | Δ | 20 | 50 | 20 | 1.904 |
| 5 | 40 | 800 | 25 | 75 | 0.35 | 6.3 | x | x | x | 50 | 50 | 50 | 1.893 |
| 6 | 60 | 800 | 5 | 95 | 1.19 | 2.6 | ○ | ○ | ○ | 20 | 20 | 20 | 1.934 |
| 7 | 60 | 800 | 10 | 90 | 0.92 | 3.3 | ○ | ○ | ○ | 20 | 20 | 20 | 1.935 |
| 8 | 60 | 800 | 15 | 85 | 0.79 | 3.6 | ○ | ○ | ○ | 20 | 20 | 20 | 1.931 |
| 9 | 60 | 800 | 20 | 80 | 0.65 | 3.7 | ○ | ○ | ○ | 20 | 20 | 20 | 1.932 |
| 10 | 60 | 800 | 25 | 75 | 0.54 | 4.2 | x | ○ | x | 50 | 20 | 50 | 1.894 |
| 11 | 80 | 800 | 5 | 95 | 1.4 | 1.2 | ○ | ○ | ○ | 20 | 20 | 20 | 1.939 |
| 12 | 80 | 800 | 10 | 90 | 1.21 | 1.8 | ○ | ○ | ○ | 20 | 20 | 20 | 1.936 |
| 13 | 80 | 800 | 15 | 85 | 1.17 | 1.9 | ○ | ○ | ○ | 20 | 20 | 20 | 1.935 |
| 14 | 80 | 800 | 20 | 80 | 0.96 | 2.1 | ○ | ○ | ○ | 20 | 20 | 20 | 1.936 |
| 15 | 80 | 800 | 25 | 75 | 0.8 | 2.3 | ○ | ○ | ○ | 20 | 20 | 20 | 1.936 |
| 16 | 100 | 800 | 5 | 95 | 1.67 | 0.6 | ○ | x | ○ | 20 | 40 | 20 | 1.935 |
| 17 | 100 | 800 | 10 | 90 | 1.43 | 0.9 | ○ | ○ | ○ | 20 | 20 | 20 | 1.934 |
| 18 | 100 | 800 | 15 | 85 | 1.31 | 1.1 | ○ | ○ | ○ | 20 | 20 | 20 | 1.934 |
| 19 | 100 | 800 | 20 | 80 | 1.19 | 1.3 | ○ | ○ | ○ | 20 | 20 | 20 | 1.932 |
| 20 | 100 | 800 | 25 | 75 | 1.02 | 1.7 | ○ | ○ | ○ | 20 | 20 | 20 | 1.934 |

| | $B_8$/T | | | | | $W_{17/50}$/(W/kg) | | | | | | |
|---|---|---|---|---|---|---|---|---|---|---|---|---|
| | Mean | | Standard deviation | | | Mean | | | Standard deviation | | | |
| No. | Intermediate winding portion | Inner winding portion | Outer winding portion | Intermediate winding portion | Inner winding portion | Outer winding portion | Intermediate winding portion | Inner winding portion | Outer winding portion | Intermediate winding portion | Inner winding portion | Remarks |
| 1 | 1.907 | 1.932 | 0.003 | 0.027 | 0.002 | 0.749 | 0.819 | 0.759 | 0.005 | 0.060 | 0.004 | Comparative Example |
| 2 | 1.928 | 1.933 | 0.002 | 0.003 | 0.002 | 0.757 | 0.765 | 0.755 | 0.004 | 0.006 | 0.003 | Example |
| 3 | 1.886 | 1.930 | 0.002 | 0.023 | 0.002 | 0.760 | 0.845 | 0.756 | 0.002 | 0.051 | 0.003 | Comparative Example |
| 4 | 1.896 | 1.900 | 0.019 | 0.030 | 0.029 | 0.816 | 0.835 | 0.826 | 0.043 | 0.066 | 0.064 | Comparative Example |
| 5 | 1.889 | 1.894 | 0.021 | 0.021 | 0.026 | 0.837 | 0.845 | 0.837 | 0.047 | 0.046 | 0.057 | Comparative Example |
| 6 | 1.927 | 1.936 | 0.002 | 0.002 | 0.002 | 0.759 | 0.754 | 0.748 | 0.002 | 0.003 | 0.003 | Example |
| 7 | 1.929 | 1.936 | 0.002 | 0.002 | 0.002 | 0.743 | 0.747 | 0.745 | 0.004 | 0.004 | 0.004 | Example |
| 8 | 1.925 | 1.933 | 0.003 | 0.002 | 0.002 | 0.755 | 0.753 | 0.753 | 0.006 | 0.004 | 0.004 | Example |
| 9 | 1.924 | 1.937 | 0.003 | 0.002 | 0.002 | 0.761 | 0.763 | 0.749 | 0.005 | 0.003 | 0.004 | Example |
| 10 | 1.923 | 1.893 | 0.027 | 0.003 | 0.030 | 0.837 | 0.765 | 0.837 | 0.060 | 0.006 | 0.066 | Comparative Example |
| 11 | 1.926 | 1.930 | 0.002 | 0.002 | 0.003 | 0.751 | 0.755 | 0.760 | 0.004 | 0.004 | 0.005 | Example |
| 12 | 1.922 | 1.931 | 0.002 | 0.002 | 0.002 | 0.748 | 0.764 | 0.752 | 0.003 | 0.003 | 0.003 | Example |
| 13 | 1.926 | 1.933 | 0.002 | 0.003 | 0.003 | 0.744 | 0.761 | 0.753 | 0.003 | 0.006 | 0.005 | Example |
| 14 | 1.927 | 1.937 | 0.002 | 0.002 | 0.002 | 0.746 | 0.759 | 0.751 | 0.004 | 0.003 | 0.004 | Example |
| 15 | 1.930 | 1.936 | 0.002 | 0.002 | 0.003 | 0.753 | 0.753 | 0.748 | 0.003 | 0.004 | 0.005 | Example |
| 16 | 1.740 | 1.936 | 0.002 | 0.018 | 0.002 | 0.748 | 1.568 | 0.747 | 0.003 | 0.040 | 0.003 | Comparative Example |
| 17 | 1.923 | 1.925 | 0.002 | 0.003 | 0.002 | 0.756 | 0.766 | 0.766 | 0.004 | 0.006 | 0.003 | Example |
| 18 | 1.922 | 1.933 | 0.003 | 0.002 | 0.002 | 0.758 | 0.767 | 0.758 | 0.005 | 0.004 | 0.003 | Example |
| 19 | 1.925 | 1.934 | 0.002 | 0.002 | 0.002 | 0.760 | 0.763 | 0.753 | 0.002 | 0.003 | 0.004 | Example |
| 20 | 1.929 | 1.936 | 0.003 | 0.002 | 0.002 | 0.755 | 0.759 | 0.745 | 0.005 | 0.004 | 0.003 | Example |

As presented in Table 2, it can be seen that by applying this disclosure, forsterite films with uniformity and excellent adhesion are obtained on steel sheets at any positions of the outer winding portion, the intermediate winding portion, and the inner winding portion. Specifically, in Examples, neither thinning nor spot detachment was observed as the film appearance, and the bending detachment diameter was as small as 20 mm.

In Examples, good magnetic properties with minimal variation were obtained on steel sheets at any positions of the outer winding portion, the intermediate winding portion, and the inner winding portion. Specifically, in Examples, the mean value of the magnetic flux density $B_8$ was 1.915 T or more, and even 1.920 T or more, and its standard deviation was 0.003 or less, at all positions of the outer winding portion, the intermediate winding portion, and the inner winding portion. In addition, in Examples, the mean value of the iron loss $W_{17/50}$ was 0.780 W/Kg or less, and even 0.770 W/Kg or less, and its standard deviation was 0.006 or less, at all positions of the outer winding portion, the intermediate winding portion, and the inner winding portion.

Thus, it can be seen that in Examples, grain-oriented electrical steel sheets with excellent film properties and magnetic properties are stably obtained over the entire length and width, regardless of the position in the coil.

INDUSTRIAL APPLICABILITY

According to this disclosure, by optimizing the BET specific surface area ratio $H_2O/N_2$ and the particle size distribution in the slurry for the main component of the annealing separator, grain-oriented electrical steel sheets with excellent film properties and magnetic properties can be more stably produced over the entire steel sheets.

The invention claimed is:
1. A method of producing a grain-oriented electrical steel sheet, the method comprising:
   subjecting a steel slab containing, in mass %, C: 0.01% to 0.1%, Si: 2.0% to 5.0%, and Mn: 0.01% to 1.0% to hot rolling to form a hot-rolled sheet;

subjecting the hot-rolled sheet to cold rolling once or more than once with intermediate annealing to form a cold-rolled sheet having a final sheet thickness;

subjecting the cold-rolled sheet to decarburization annealing to form a decarburization annealing sheet;

applying an annealing separator having MgO as a main component on a surface of the decarburization annealing sheet; and subsequently subjecting the decarburization annealing sheet on which the annealing separator is applied to final annealing, wherein the main component of the annealing separator has a BET specific surface area ratio $H_2O/N_2$ of 0.6 to 1.6 and a percentage of particles with a particle size of 40 μm or more in a slurry state of 5 mass % or less.

2. The method of producing a grain-oriented electrical steel sheet according to claim 1, wherein the main component of the annealing separator has a BET specific surface area ratio $H_2O/N_2$ of 0.8 to 1.4 and a percentage of particles with a particle size of 40 μm or more in a slurry state of 5 mass % or less.

* * * * *